United States Patent
Wise et al.

(10) Patent No.: US 6,446,981 B1
(45) Date of Patent: Sep. 10, 2002

(54) CART WITH CONVERTIBLE COVER/TABLE

(75) Inventors: Gerald C. Wise, Hudson; Cristina N. Gerwitz, Lakewood; Mark S. Coats, Shaker Heights, all of OH (US)

(73) Assignee: The Little Tikes Company, Hudson, OH (US)

( * ) Notice: Subject to any disclaimer, the term of this patent is extended or adjusted under 35 U.S.C. 154(b) by 0 days.

(21) Appl. No.: 09/728,463

(22) Filed: Dec. 1, 2000

(51) Int. Cl.[7] .............................................. A63C 17/18
(52) U.S. Cl. .................. 280/7.17; 280/827; 280/87.01; 280/79.7; 280/47.34; 280/651; 280/658; 280/30; 296/177; 446/78; 446/451; 297/119; 297/217.1; 297/135; 297/184.1; 297/184.11
(58) Field of Search .............................. 280/827, 87.01, 280/87.021, 87.05, 79.7, 47.34, 47.35, 651, 30, 658, 7.1, 7.15, 7.17, 655, 655.1; 296/103, 177; 446/78, 94, 95, 96, 451; D21/425; D12/129; 297/118, 119, 217.1, 135, 184.1, 184.11; 108/50.11, 153.1

(56) References Cited

U.S. PATENT DOCUMENTS

| | | | | |
|---|---|---|---|---|
| 288,663 A | * | 11/1883 | Reed ........................ 280/87.01 |
| 996,636 A | * | 7/1911 | Gabriel ..................... 280/87.01 |
| 1,097,163 A | * | 5/1914 | Brown ...................... 280/47.34 |
| 1,396,039 A | | 11/1921 | Halm |
| 1,493,243 A | * | 5/1924 | Chandler .................. 280/47.34 |
| 2,382,982 A | | 8/1945 | Elliott .......................... 46/16 |
| 2,605,812 A | | 8/1952 | Benze ......................... 155/41 |
| 2,942,914 A | * | 6/1960 | Noot .................... 280/87.01 X |
| 3,528,193 A | | 9/1970 | Yamakawa ...................... 46/17 |
| 3,939,600 A | | 2/1976 | Eid ............................... 46/17 |
| 3,982,352 A | | 9/1976 | Branson ........................ 46/17 |
| 4,265,461 A | | 5/1981 | Okubo ....................... 280/1.13 |
| 4,664,396 A | | 5/1987 | Pletrafesa ..................... 280/30 |
| 4,735,426 A | * | 4/1988 | McConnell .............. 280/87.01 |
| 4,773,547 A | * | 9/1988 | Bell ........................... 211/194 |
| 4,795,210 A | * | 1/1989 | Milat ......................... 297/194 |
| 4,958,842 A | | 9/1990 | Chang ........................ 280/7.1 |
| 4,984,813 A | | 1/1991 | Takahashi et al. ............ 280/30 |
| 4,993,983 A | | 2/1991 | Kurita et al. .................. 446/94 |
| D323,252 S | * | 1/1992 | Anske ........................ D6/429 |
| 5,104,134 A | | 4/1992 | Cone .......................... 280/30 |
| 5,106,150 A | | 4/1992 | Litwicki ..................... 296/216 |
| 5,265,892 A | | 11/1993 | Said ............................. 280/30 |
| 5,265,912 A | | 11/1993 | Natividad ................... 280/828 |
| 5,294,153 A | * | 3/1994 | Nolan ........................ 280/827 |
| D361,418 S | | 8/1995 | Smith .......................... D34/19 |
| 5,447,354 A | | 9/1995 | Delp .......................... 296/104 |
| 5,460,391 A | | 10/1995 | Gantz et al. .................. 280/30 |
| 5,474,483 A | | 12/1995 | Sun ............................. 446/71 |
| 5,538,267 A | | 7/1996 | Pasin et al. .............. 280/87.01 |
| 5,772,222 A | | 6/1998 | Sim et al. ..................... 280/30 |
| 5,833,251 A | * | 11/1998 | Peck ....................... 280/87.01 |
| 5,857,695 A | | 1/1999 | Crowell ..................... 280/651 |
| 5,893,606 A | | 4/1999 | Chiang ...................... 297/118 |
| 6,079,719 A | * | 6/2000 | Tisbo et al. ............... 280/47.35 |
| 6,260,566 B1 | * | 7/2001 | LaFave et al. ........... 135/88.01 |
| D447,522 S | * | 9/2001 | Ainsworth et al. ........ D21/425 |

* cited by examiner

Primary Examiner—Brian L. Johnson
Assistant Examiner—Bryan Fischmann
(74) Attorney, Agent, or Firm—Piper Rudnick

(57) ABSTRACT

A cart including a body, at least two wheels, and a frame. The body has an upper surface and a lower surface. The at least two wheels are operably coupled to the body. The frame includes a generally planar and substantially rigid upper member and at least one leg support member. The leg support member is coupled to the upper member and is releasably coupled to the body. The frame is positionable in a first configuration, wherein the upper member is substantially disposed over the upper surface of the body thereby forming a cover, and a second configuration, in which the frame is decoupled from the body and placed on a generally horizontal surface thereby forming a table. The frame includes means for releasably coupling the at least one leg support member to the body without the use of tools. A table includes a generally planar and substantially rigid first member, and leg support members. The first member substantially extends between and connects the leg support members. The leg support members each include at least one extension for releasably engaging the cart.

18 Claims, 9 Drawing Sheets

CART WITH CONVERTIBLE COVER/TABLE

FIELD OF THE INVENTION

The present invention relates generally to carts and tables. More particularly, the invention relates to a cart, such as a wagon, having a detachable cover which also functions as a table.

BACKGROUND OF THE INVENTION

Wheeled carts, such as toy wagons and toy ride-in vehicles, are well known versatile vehicles for children. Such carts, particularly wagons, are well suited for travel over all types of surfaces including pavement, grass or sand. Wagons are particularly well suited for general play, or for transporting children or supplies. In addition, wagons are especially useful for picnics, trips to the beach, and sporting events. Wagons and toy ride-in vehicles often include covers or roofs. Wagon covers are typically made of fabric and are downwardly sloped from a centrally and longitudinally positioned upper support member toward each side of the wagon. Covers or roofs for toy ride-in vehicles include a convex or downwardly curved top portion. Wagon covers and roofs for toy ride-in vehicles enable the cart to resemble a covered wagon or a full-size vehicle, such as an automobile.

Tables are also well known. Additionally, a cart assembly which can be converted into a table is also known.

Existing wheeled carts, existing tables and existing convertible carts have a number of drawbacks. Many wheeled carts, including wagons and toy ride-in vehicles, do not include a roof or a cover and therefore provide little or no protection for children or objects positioned within the cart from sunlight or precipitation. Those carts which include a cover or a roof typically are configured such that the cover or the roof is fixedly secured to the cart. Further, the fixed connection of a cover or a roof to a cart requires the use of tools in order to assemble or disassemble the roof or cover to, or from, the cart. Additionally, many tables, including collapsible tables, are too large or too heavy to be easily transported. When attempting to transport a collapsible, or otherwise portable table using, for example, a wagon, the size of such a table typically inhibits other articles or children from also being carried within the same wagon.

Existing cart assemblies which convert into a table typically require the completion of a series of elaborate and complex steps in order to complete the transformation of the cart into a table. The transformation process also usually requires the removal of all objects and persons from the cart during the transformation steps. Moreover, existing cart assemblies which convert into a table cannot simultaneously function as both a cart and a table. Once converted to a table, the cart assembly cannot function as a cart or a wagon, and the process must be reversed in order for the cart assembly to function as a cart or a wagon.

Thus, there is a need for a wheeled cart having a roof or a cover which can be easily connected to or removed from the cart. What is needed is a cart which can easily and safely accommodate a table, children, supplies or a combination thereof. What is needed is a table which can be transported by a cart, such as a wagon, without monopolizing the storage capacity of the cart. It would therefore be advantageous to develop a cart assembly which can function as a table and as a cart.

SUMMARY OF THE INVENTION

The present invention provides a cart including a body, at least two wheels, and a frame. The body has an upper surface and a lower surface, one of the at least two wheels are operably coupled to the body. The frame includes a generally planar and substantially rigid upper member and at least one support member. The support member is coupled to the upper member and is releasably coupled to the body.

The frame is positionable in a first configuration, wherein the upper member is substantially disposed over the upper surface of the body thereby forming a cover, and a second configuration, in which the frame is decoupled from the body and placed on a generally horizontal surface thereby forming a table.

According to a principal aspect of the invention, a cart includes a body, a plurality of wheels and a frame. The body includes an upper surface, and the wheels are rotatably coupled to the body. The frame includes a generally planar and substantially rigid upper member coupled to at least one support member, and a device for releasably coupling the at least one support member to the body without the use of tools. The frame is configured for removable placement substantially over the upper surface of the body.

According to a another aspect of the invention, a table is configured for removable attachment to a cart without the use of tools. The table includes a generally planar and substantially rigid first member, and second and third substantially rigid members. The first member substantially extends between and connects the second and third members. The second and third members each include at least one extension for releasably engaging the cart.

This invention will become more fully understood from the following detailed description, taken in conjunction with the accompanying drawings described herein below, and wherein like reference numerals refer to like parts.

DETAILED DESCRIPTION OF THE PREFERRED EMBODIMENTS

Figure 1:
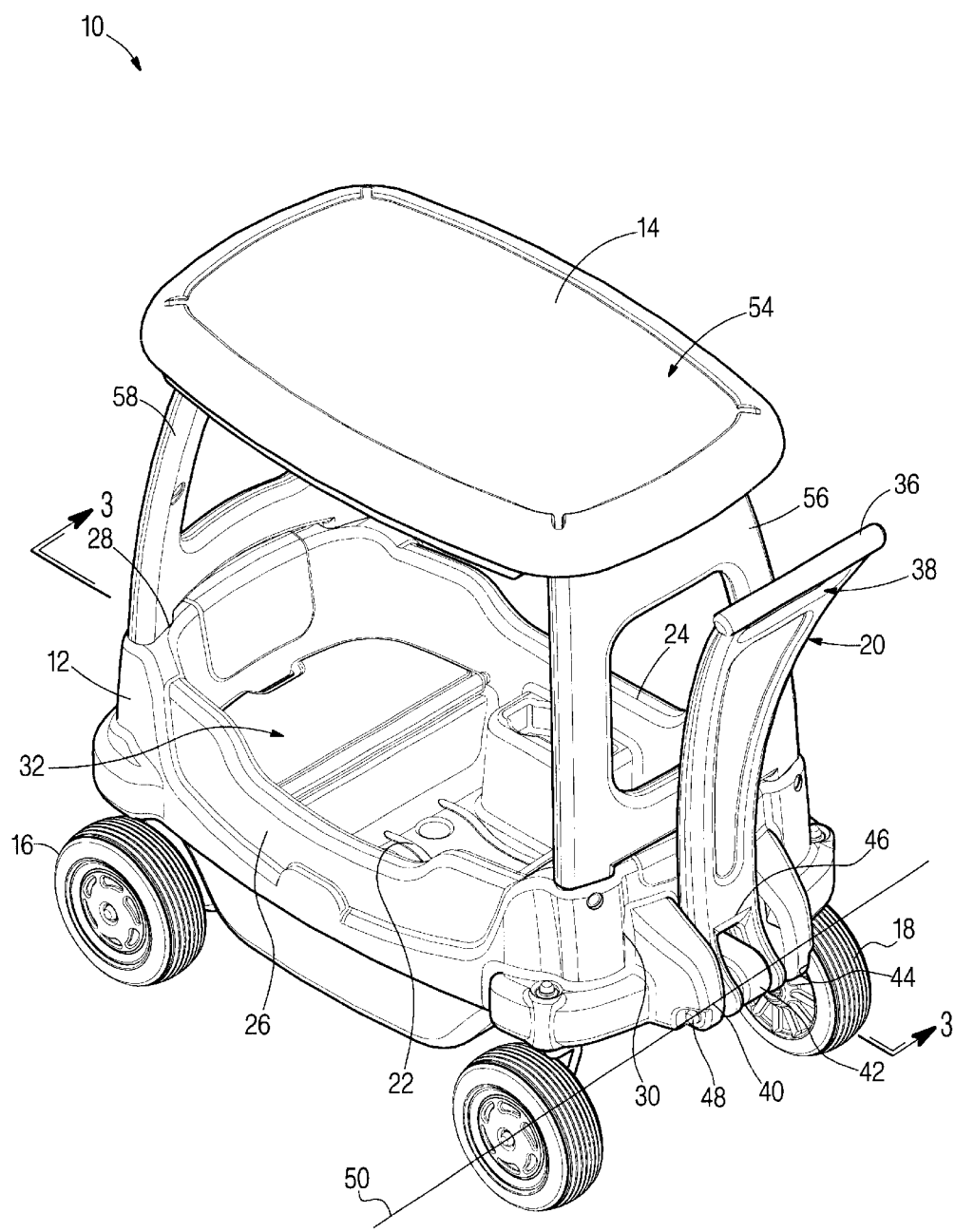
FIG. 1 is a perspective view of a cart assembly in accordance with the present invention.

Referring to FIG. 1, a cart assembly 10 having a detachable cover 14 is illustrated. In a preferred embodiment, the cart assembly 10 is a covered wagon. In alternative preferred embodiments, the cart assembly 10 can be a toy ride-in vehicle or other type of push/pull toy vehicle. The cart assembly 10 is a portable vehicle with the detachable cover 14 configured to also serve as a table. The cart assembly 10 includes a vehicle chassis 12, the cover 14, a pair of rear wheels 16, a pair of front wheels 18 and a handle assembly 20.

The vehicle chassis 12 is preferably a generally rectangular body, but other chassis shapes are also contemplated. The chassis 12 includes a lower panel 22 formed to opposing upwardly extending left and right side walls 24 and 26, a rear wall 28 and a front wall 30. The left and right side walls 24, 26, the rear wall 28 and the front wall 30 and the lower panel 22 define a first storage compartment 32. The compartment 32 is open at the top for access by passengers, such as children, or for supplies. The chassis 12 is configured to support supplies, at least one rider or a combination thereof. The chassis 12 preferably can comfortably support at least two children. The chassis 12 is made of a durable and lightweight material. In a preferred embodiment, the chassis 12 is made of a rotationally molded thermoplastic material. Alternatively, the chassis 12 can be made of other materials such as, for example, other plastics, wood or metal.

The cover 14 is a generally planar and substantially rigid tabletop 54 substantially extending between and connected to first and second upstanding leg support members 56 and 58. The cover 14 is releasably coupled to the chassis 12. When coupled to the chassis 12, the cover 14 is spaced apart from, and substantially covers, the upper surface of the chassis 12. The cover 14 can prevent sunlight or precipitation from contacting a portion of the compartment 32 of the chassis 12. The cover 14 can be formed such that the cart assembly 10 resembles a covered wagon or a vehicle (such as a toy ride-in automobile). The cover 14 and first and second upstanding leg support member 56 and 58 form a frame.

The rear and front wheels 16 and 18, respectively, are conventionally known cart or wagon wheels. The rear wheels 16 are rotatably coupled to the chassis 12, and the front wheels are pivotally and rotatably coupled to the chassis 12.

The handle assembly 20 is an outwardly extending lever arm. The handle assembly 20 is pivotally connected to the front wall 30 of the vehicle chassis 12. The handle assembly 20 is also configured to pivotally adjust to the height of a person using the handle assembly 20 to pull the cart assembly 10. The handle assembly 20 includes a distal end 36 which includes an opening 38. The distal end 36 is configured for grasping by a person for pulling or pushing the cart assembly 10. In a preferred embodiment, the handle assembly 20 has an arcuate profile which outwardly and forwardly extends from the front wall 30 of the vehicle chassis 12. Other handle assembly 20 configurations can also be used. In a preferred embodiment, the handle assembly 20 can pivot such that it fits completely under the lower panel 22 of the chassis 12 to facilitate storage of the cart assembly 10. The handle assembly 20 is made of a durable lightweight, strong material. The handle assembly 20 is preferably made of a blow molded thermoplastic material, alternatively, other materials can be used such as, for example, other plastics, wood or metal.

In a preferred embodiment, the front wall 30 of the vehicle chassis 12 includes three projections 40, 42 and 44 for connecting to the handle assembly 20. The projections 40, 42 and 44 forwardly extend from the front wall 30 and are spaced apart from one another. The handle assembly 20 further preferably includes a bifurcated proximal end 46 which is configured to fit within the spaces existing between the projections 40, 42 and 44. The proximal end 46 of the handle assembly 20 and each projection includes a hole for accommodating a handle assembly axle 48. The handle assembly axle 48 extends generally horizontally through the projections 40, 42 and 44 and through the proximal end 46 of the handle assembly 20 along an axis 50 that is transverse to a major longitudinal dimension of the cart assembly 10. The axle 48 enables the handle to pivot about the axis 50 such that the height of the distal end 36 can be adjusted to comfortably match the height of the user's arm for grasping, and pushing or pulling of the cart assembly 10 by a user. In an alternative embodiment, the handle assembly 20 can be removably attached or attached by alternative means, and can be coupled to the front or rear end of the chassis 12.

Figure 2:
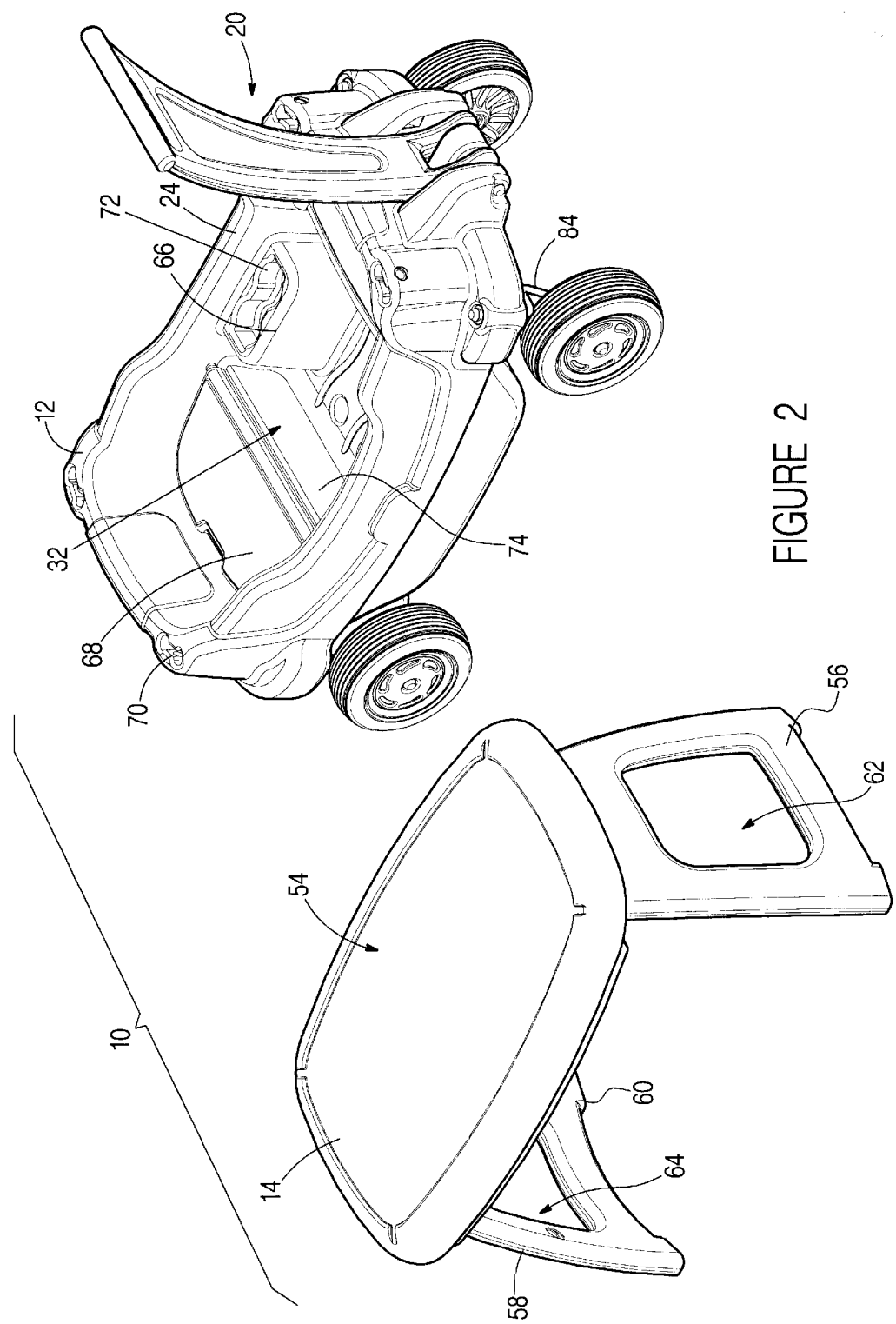
FIG. 2 is a perspective view of the cart assembly of FIG. 1 wherein cover of the cart assembly is shown separated from a chassis of the cart assembly.

FIG. 2 illustrates the cover 14 and the chassis 12 in greater detail. When detached from the chassis 12, as shown in FIG. 2 the cover 14 is configured to serve as a table. The first and second upstanding leg support members 56 and 58 are preferably releasably coupled to the tabletop 54. The tabletop 54 is preferably formed in a general rectangular shape. The tabletop 54 is configured to substantially cover the chassis 12 and to support foodstuffs, dishware and other objects. The first and second upstanding leg support members 56 and 58 of the cover 14 are configured to support the tabletop 54 in a generally horizontal position above either the chassis 12 or a generally horizontal surface. Each of the first and second leg support members 56 and 58 includes two downwardly extending projections 60. The projections 60 are configured to releasably engage the chassis 12 and for placement onto a surface. The first and second leg support members 56 and 58 each further include a centrally positioned, substantially rectangular window opening 62 and 64, respectively. The window openings 62 and 64 enable a person to see through the leg support members 56 and 58. When attached to the chassis 12, the window openings 62 and 64 also reduce the amount of material and the overall weight of the cover 14 without significantly decreasing the strength of each support member 56 and 58. The tabletop 54, and the first and second leg support members 56 and 58 are preferably made of a blow molded thermoplastic material. Alternatively, the first and second leg support members 56 and 58 can be made of other materials such as, for example, wood or steel. In an alternative preferred embodiment, four leg supports can be used in lieu of the first and second leg support members 56 and 58.

As also illustrated in FIG. 2, the chassis 12 further includes a cup-holder portion 66 and a seat member 68. Additionally, four recesses 70 are defined into the upper corners of the chassis 12. Each of the recesses 70 is configured to releasably receive one of the projections 60 of the leg support members 56 and 58. The cup-holder portion 66 inwardly extends from and is integrally formed to the left wall 24 of the vehicle chassis 12. Alternative locations for the cup-holder portion 66 are contemplated. The cup-holder portion 66 includes at least two cup-holder openings 72 for supporting beverages. The cup-holder portion 66 is preferably integrally formed to the chassis 12. Alternatively, the multiple cup-holder portions 66 can be coupled to the vehicle chassis 12.

The seat member 68 is a generally rectangularly planar sheet, and also removably connects to the chassis 12. The seat member 68 is configured to enable a passenger to be in a seated position. The seat member 68 is made of a durable lightweight material which preferably is a blow molded thermoplastic material. Alternatively, the seat member 68 can be made of other materials such as, for example, wood, metal or other plastics. In alternative embodiments, the seat member 68 can be pivotably, slidably or integrally connected to the chassis 12.

Figure 3:
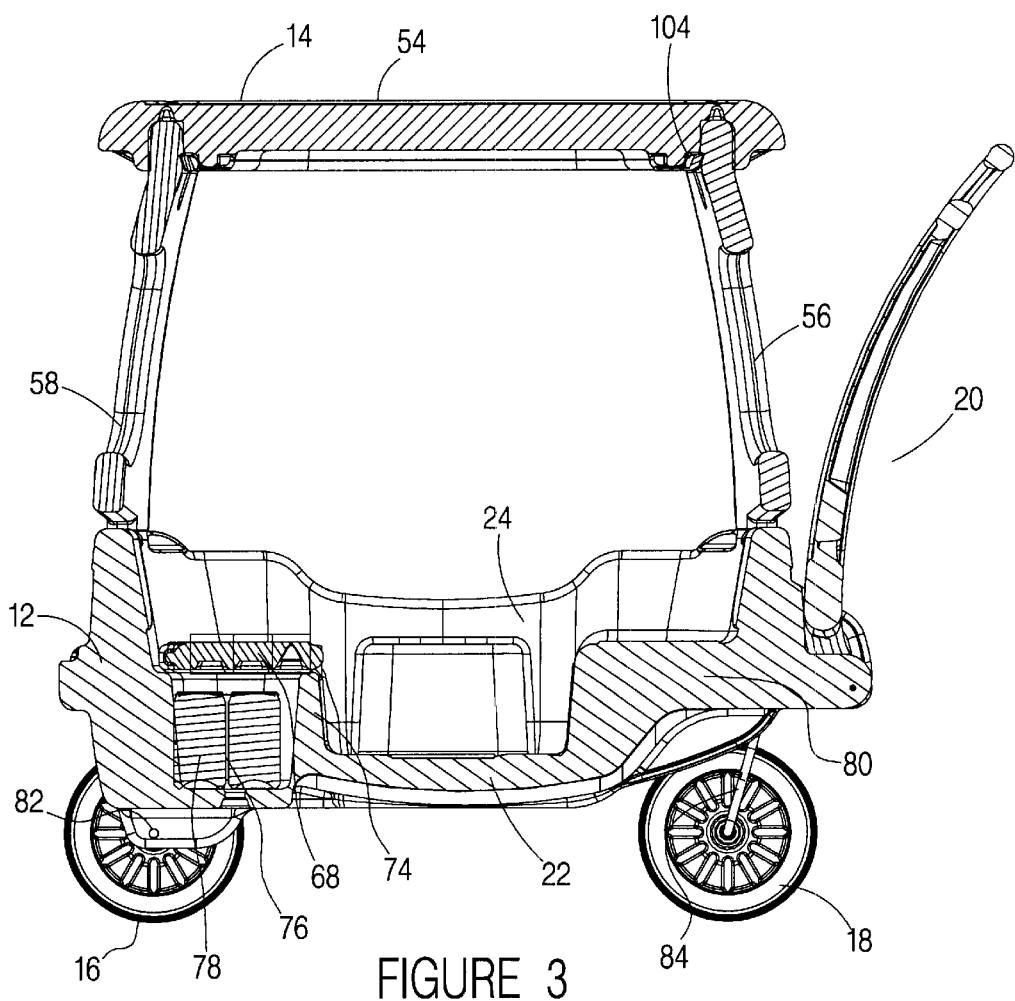
FIG. 3 is a longitudinal cross-sectional view along the longitudinal center line 3—3 of the cart assembly of FIG. 1.

FIG. 3 illustrates the chassis 12 and the cover 14 in even greater detail. Referring to FIGS. 2 and 3, a partition 74 upwardly extends from the lower section 22 of the vehicle chassis 12. The partition 74 transversely extends between the left and right sidewalls 24, 26 of the chassis 12 (see FIG. 1), and is preferably integrally formed as part of the chassis 12. Alternatively, the partition 74 can be a separate member which is removably connected within or to the vehicle chassis 12. The partition 74 is configured to support a front end of the seat member 68. The chassis 12, the partition 74 and the seat member 68 together define a second storage compartment 76 within the vehicle chassis 12. In a preferred embodiment, the partition 74, the chassis 12 and the seat member 68 form a cooler for storing beverages 78 and other food stuffs in the second storage compartment 76.

A second seat 80 is also formed into the front end of the vehicle chassis 12. The second seat 80 extends into the first storage compartment 32 of the chassis 12. The second seat 80 is configured to support a passenger in a seated position, or supplies. The second seat 80 is preferably and integrally formed to the chassis 12. Alternatively, the second seat 80 can be a removable member removeably attached to the chassis 12. In alternative embodiments, the chassis 12 can be formed with a single seat or no seats.

As also shown on FIGS. 2 and 3, the rear pair of wheels 16 are pivotally connected to the chassis 12 through a rear axle 82. The rear axle 82 transversely extends through the lower rear end of the chassis 12. The pair of front wheels 18 are pivotally and rotatably connected to the chassis 12 through a pair of bent axles 84. Each of the bent axles 84 includes a first end which is rotatably connected to one of the front wheels 18 and a second end which is pivotally connected to the chassis 12. The first end of the bent axle 84 lies along a substantially horizontal axis and the second end of the bent axle 84 lies along a substantially vertical axis. The connection of the first end of the bent axle 84 to the front wheel enables the wheel to rotate about the first end of the bent axle 84. The connection of the second end of the bent axle 84 to the vehicle chassis 12 enables the bent axle 84 to rotate, and the front wheel 18 to pivot, about the substantially vertical axis.

The front and rear wheels 16 and 18 enable the cart assembly 10 to be easily transported from one location to another. The wheels 16 and 18 are made of a strong, lightweight and durable material. Preferably, the wheels 16 and 18 are made of a blow molded thermoplastic material. Alternatively, the wheels can be made of other materials such as rubber, other plastics, wood, metal, or a combination thereof.

Figure 4:
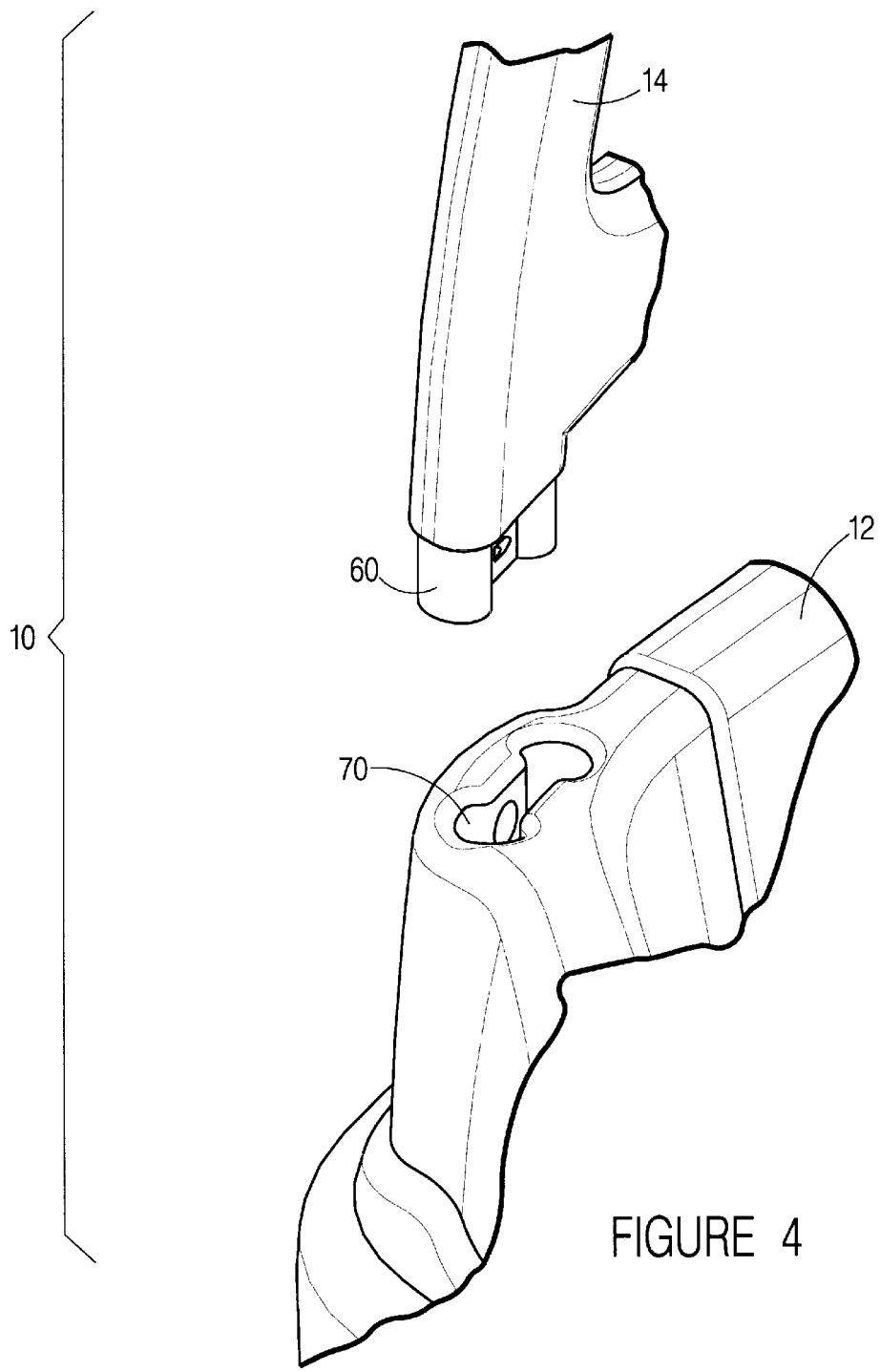
FIG. 4 is an exploded view of a portion of the cover and a portion of the chassis of the cart assembly of FIG. 1.
Figure 5:
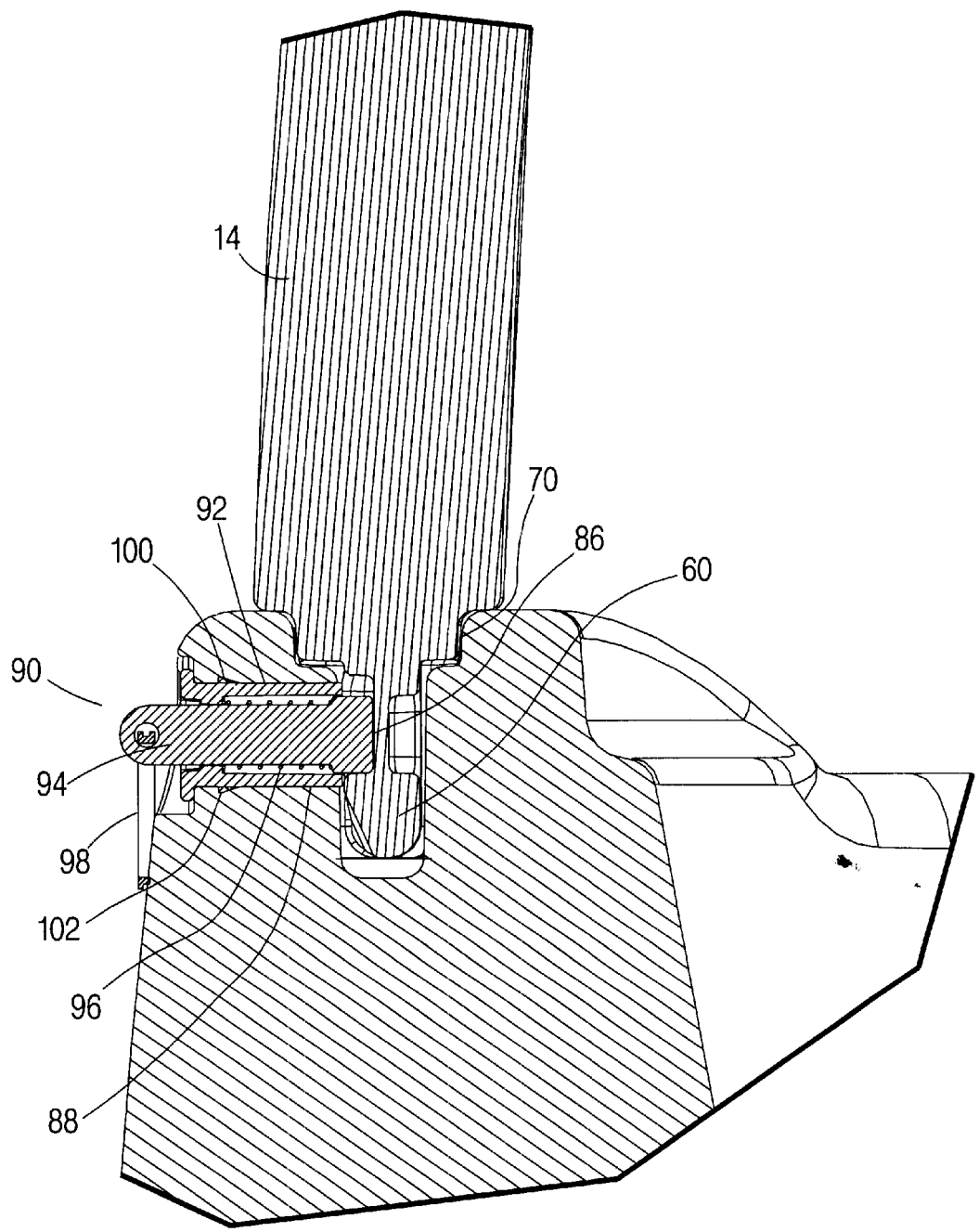
FIG. 5 is a longitudinal, sectional view illustrating the connection of the cover and the chassis of the cart assembly of FIG. 1.

FIGS. 4 and 5 illustrate the coupling of one of the leg support members 56 and 58 of the cover 14 to the chassis 12. Each of the projections 60 of the leg support members 56 and 58 (see FIG. 3) is configured to releasably engage the chassis 12 at one of the recesses 70 in FIG. 5. Each of the projections 60 includes a pin engaging recess 86 for engaging the chassis 12. Referring to FIG. 5, a through-wall pin assembly opening 88 is defined at each corner of the chassis 12. The pin assembly openings 88 each receive a pin assembly 90. Each of the pin assemblies 90 is a biasing device which is operably connected to the chassis 12 at the pin assembly openings 88. The pin assembly 90 is configured to releasably engage one of the projections 60 of the leg support members 56 and 58 (see FIG. 3).

As shown in FIG. 3 and 5, each of the pin assemblies 90 also include a sleeve 92, a pin 94, a spring 96 and a ring 98. The sleeve 92 is a tubular member configured to be press fit within the pin assembly opening 88 of the chassis 12. The sleeve 92 includes an annular projection 100 which engages an annular slot 102 formed within the chassis 12. The annular slot 102 interconnects with the pin assembly opening 88. The engagement of the annular projection 100 within the annular slot 102 of the chassis 12 fixedly secures the sleeve 92 within the chassis 12. The sleeve 92 is configured to support and retain the pin 94 and the spring 96. The sleeve 92 is preferably made of plastic, but alternatively, the sleeve 92 can be made of other materials such as metal.

The pin 94 is a cylindrical member configured to axially extend through the sleeve 92. The pin 94 includes a projection engaging end and a ring engaging end. The pin 94 is positioned within the sleeve 92 such that the projection engaging end of the pin 94 inwardly extends into the recess 70 of the chassis 12 for releasable engagement with the recess 86 of the projection 60. The ring engaging end of the pin 94 outwardly extends from one of the front or the rear walls 30 and 28 of the chassis 12 for connection with the ring 98.

The spring 96 is a biasing member. The spring 96 is disposed within the sleeve 92 and around the pin 94. The spring 96 is connected to the pin 94 within the sleeve 92. The spring 96 is preferably a helical spring and it functions to bias the pin 94 inwardly toward the recess 70 of the chassis 12. Alternative conventional biasing devices can also be used in lieu of a helical spring.

The ring 98 includes an annular member connected through a hole defined within the ring engaging end of the pin 94. The ring 98 is configured for grasping by a user thereby enabling the user to easily outwardly extend the pin 94 such that the projection engaging end of the pin 94 enables the projection 60 of the leg support members 56 and 58 to be easily inserted within or removed from the recess 70. Upon removal or insertion of the projection 60 from or into the recess 70, the ring 98 can be released enabling the pin engaging end of the pin 94 to reenter the recess 70 of the chassis 12.

The pin assembly 88 enables the cover 14 to be quickly and easily disengaged from the chassis 12 without the use of tools. The disassembly of the cover 14 from the chassis 12 is accomplished through the following steps: the user grasps the ring 98 and outwardly pulls the ring 98 thereby causing the pin 94 to translate within the sleeve 90 drawing the projection engaging end of the pin 94 substantially out from within the recess 70 of the chassis 12. The projection 60 of the leg support member 56 or 58 can then be lifted from the recess 70 thereby disengaging the projection 60 from chassis 12. This step is then repeated at each of the four corners of the chassis 12 to fully disassemble or separate the cover 14 from the chassis 12.

Reassembly of the cover to the chassis 12 is accomplished by reversing the previously listed steps. The projection 60 is aligned within the upper portion of the recess 70 and the ring 98 is grasped and outwardly deflected, causing the pin 94 to translate outward thereby enabling the projection 60 of the leg support member 56 or 58 to fully enter the recess 70. The ring 98 is then released allowing the spring 96 to bias the pin 94 inward such that the projection engaging end of the pin 94 enters the recess 70 and engages the pin receiving recess 86 of the projection 60. This is repeated with the three remaining corners of the chassis 12 in order to fully engage the cover 14 with the chassis 12. The quick and easy removal of the cover from the chassis 12 enables any user to enjoy the use of the cart assembly 10.

Figure 6:
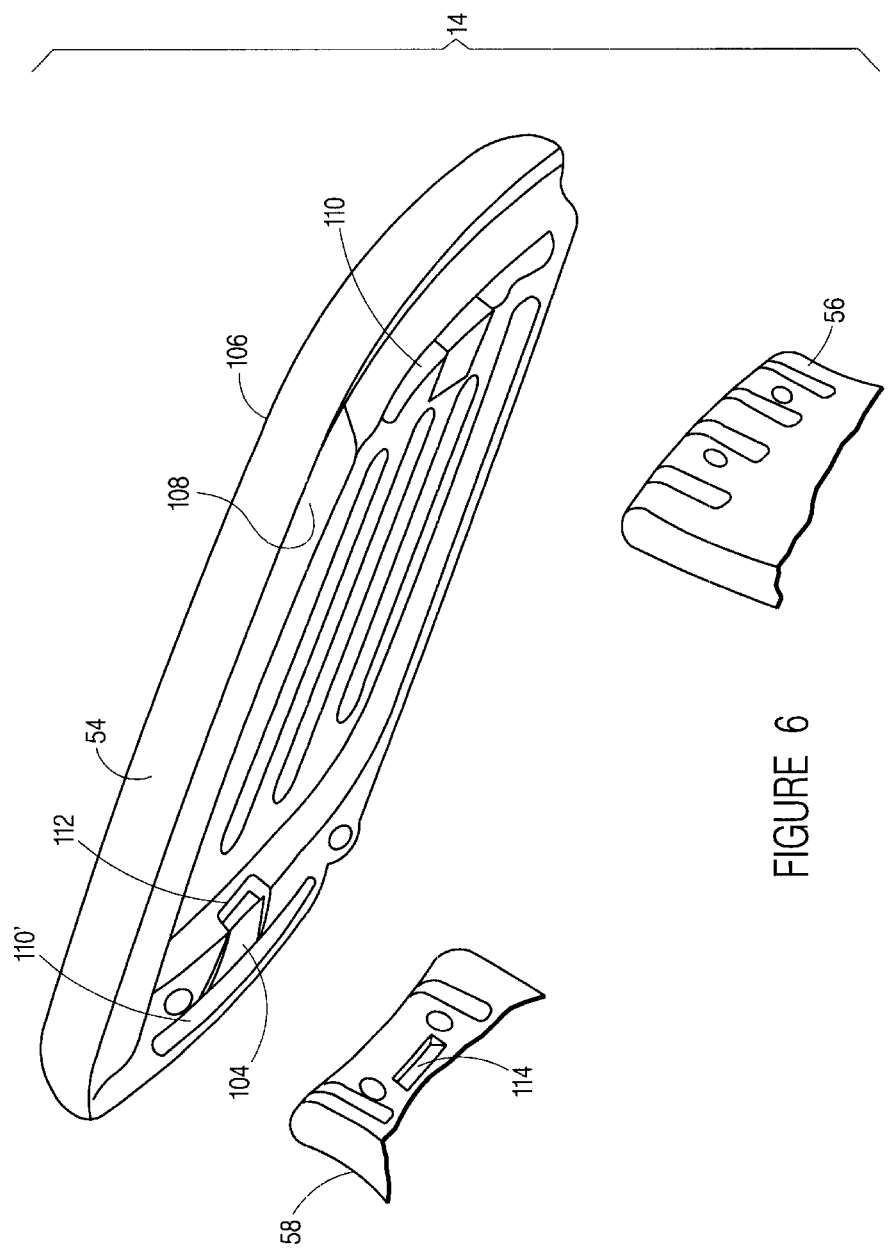
FIG. 6 is an exploded perspective view of the cover of the cart assembly of FIG. 1.

FIG. 6 illustrates the cover 14 in detail. The first and second leg support members 56 and 58 are releasably connected to the tabletop 54 through the use of a clip assembly 104. The tabletop 54 includes an upper surface 106 and a lower surface 108. A pair of transversely extending channels 110 are defined within the lower surface 108 of the tabletop 54. The channels 110 are positioned at the forward and rear ends of the tabletop 54 and are each configured to receive an upper end of one of the first and second leg support members 56 and 58. The tabletop 54 further includes a pair of grooves 112 also defined within the lower surface 108 of the tabletop 54. Each of the grooves 112 is interconnected with one of the channels 110. Each of the grooves 112 extends longitudinally along a portion of the lower surface 108 of the table tabletop 54. Each of the grooves 112 is configured to receive one of the clip assemblies 104. The upper end of each of the first and second leg support members 56 and 58 include a clip engaging slot 114. The clip engaging slot 114 transversely extends along a central portion of the inner surface of each of the first and second leg supporting members 56 and 58. The clip engaging slot 114 is configured to releaseably engage the clip assembly 104.

Figure 7:
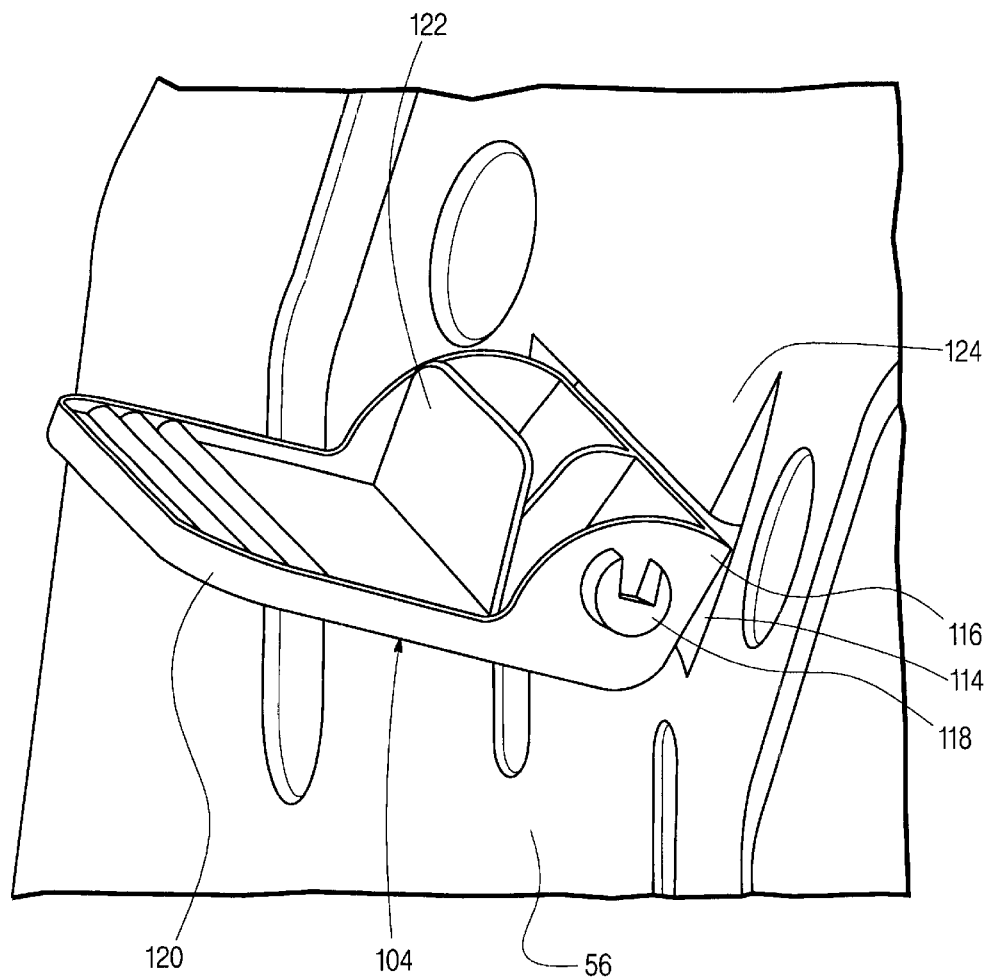
FIG. 7 is a perspective view of a clip assembly and the leg support member of the cart assembly of FIG. 1.

FIG. 7 illustrates the clip assembly 104 and the leg support member 56 in greater detail. The clip assembly 104 is pivotally connected to the lower side 108 of the tabletop 54 (see FIG. 6). The clip assembly 104 releasably connects the tabletop 54 to the leg support members 56 and 58. The clip assembly 104 includes an engaging end 116 and a pair of opposing protrusions 118, an extension 120 and a leaf spring 122. The engaging end 116 is an angled projection formed at the side of the clip assembly 104 facing the leg support member 56 or 58. The engaging end 116 is configured to pivot with the clip assembly 104 to releasably engage the slot 114 and a raised surface 124 of the leg support member 56 or 58. The raised surface 124 inwardly extends from the inner surface of the leg support member 56 or 58 adjacent to the slot 114. In alternative embodiments, each of the leg support members 56 and 58 can include one or both of the slot 114 and the raised surface 124 for engaging the clip assembly 104.

The pair of opposing protrusions 118 outwardly and transversely extend from either side of the clip assembly 104. The protrusions 118 connect to the tabletop 54 at to holes (not shown) defined in the tabletop 54 and interconnected to the channel 112. The protrusions 118 enable the clip assembly 104 to pivotally connect to the tabletop 54.

Figure 8:
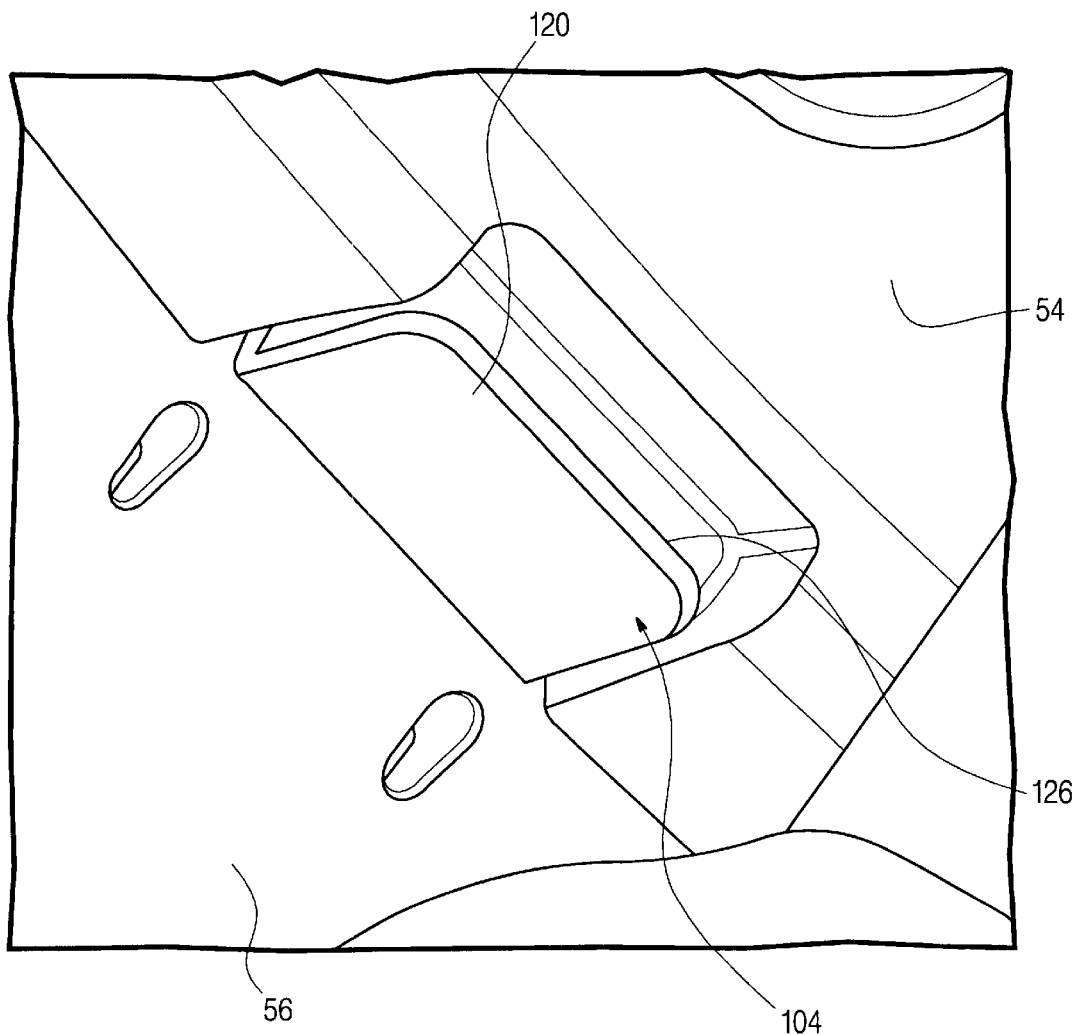
FIG. 8 is view of the connection of a tabletop and the leg support member of the cover of the cart assembly of FIG. 1.

Referring to FIGS. 7 and 8, the extension 120 is a flat portion of the clip assembly 104 which extends within the channel 112 of the tabletop 54. The extension 120 forms the lower surface of the clip assembly 104 and outwardly extends from the remaining portions of the clip assembly 104 such that a portion 126 of the channel 112 remains exposed for grasping by a user. The extension 120 enables a user to grasp and pivot the clip assembly 104 to disengage the engaging end 116 of the clip assembly 104 from the leg support member 56 or 58.

Referring to FIG. 7 the leaf spring 122 is an upwardly extending portion of the clip assembly 104 which is connected to the lower side 108 of the tabletop 54. The leaf spring 122 is configured to further connect the clip assembly 104 to the tabletop 54 and also to bias the clip assembly 104 to a substantially horizontal position following movement of the clip assembly 104.

FIG. 8 illustrates the clip assembly 104 connecting the tabletop 54 to one of leg support members 56 or 58. The clip assembly 104 enables a user to quickly and easily separate the tabletop 54 from the leg support members 56 and 58 without the use of tools. The clip assembly 104 facilitates storage of the cart assembly 10 and increases the versatility of the cover 14 and the tabletop 54.

In alternative embodiments, the cover 14 can be releasably attached to the chassis 12 through other means such as, for example, other spring release assemblies, pushbutton release assemblies, a hook and latch assembly and a snap-fit type of connection. In alternative embodiments, the clip assembly 104 can also be replaced with other means for releasably connecting the tabletop 54 to the leg support members 56 and 58, including, for example, spring release assemblies, pushbutton release assemblies, a hook and latch assembly and a snap-fit type of connection.

The cart assembly 10 with the removable cover 14 which converts into a table is ideal for transporting children or supplies. The cart assembly 10 is particularly well suited for picnics, a visit to the beach or any outdoor activity. The cart assembly 10 eliminates the need to carry a bulky and heavy collapsible table to outdoor events. The quick release connections of the cover 14 to the chassis 12, and the tabletop 54 to the leg support members 56 and 58 of the cover makes the cart assembly 10 easy to disassemble and to store. The range of movement of the handle assembly 20, which can be pivoted about the axis 50 and placed under the chassis 12, also facilitates storage of the cart assembly 10.

Figure 9:
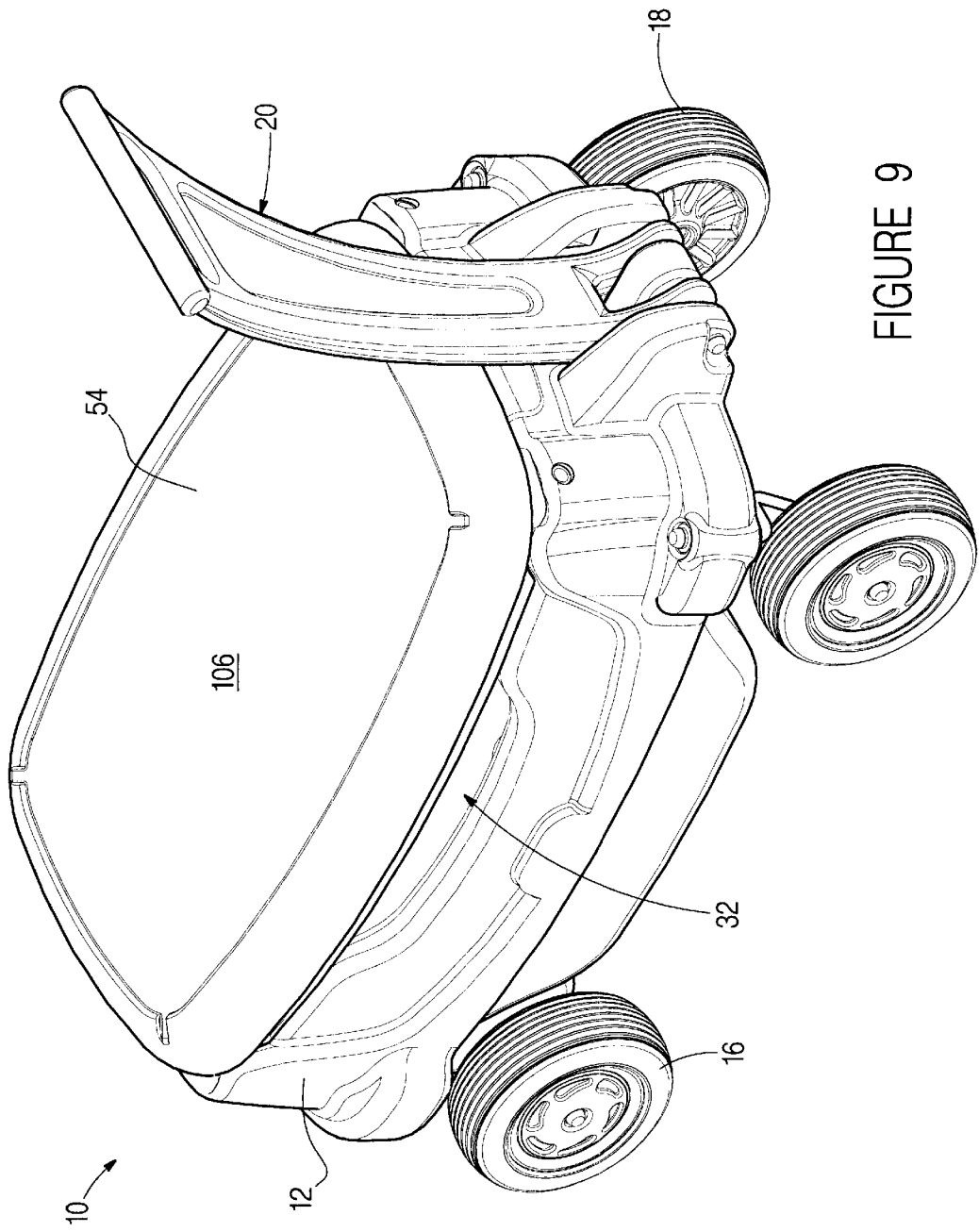
FIG. 9 is a perspective view of the cart assembly of FIG. 1 with the tabletop disposed directly onto the chassis.

Referring to FIG. 9, the cart assembly 10 can also be converted into a "flat bed" mode in which the tabletop 54 is positioned directly onto the upper surface of the chassis 12. The releasable connection of the first and second leg support members 56 and 58 (see FIG. 1) to the chassis 12, and the releasable connection of the first and second leg support members 56 and 58 (see FIG. 1) to the tabletop 54 enables a user to easily remove the first and second support members 56 and 58 from the cover 14 (see FIG. 1) and position the tabletop 54 directly and securely onto the upper surface of the chassis 12. When positioned onto the upper surface of the chassis 12, the tabletop 54 substantially encloses the first storage compartment 32. The substantially enclosed first storage compartment 32 is well suited for storage of toys, tools, supplies and equipment. The positioning of the tabletop 54 directly onto the chassis 12 also inhibits sunlight, precipitation or debris from entering the compartment 32. When in the "flat bed" mode, the upper surface 106 of the tabletop 54 provides a generally flat surface well suited for transporting large objects such as, for example, shrubs, trees, coolers, collapsible chairs, umbrellas and lumber. In a preferred embodiment, the lower surface 108 (see FIG. 6) of the tabletop 54 includes contours for facilitating the secure positioning of the tabletop 54 onto the chassis 14. In another preferred embodiment, the tabletop 54 can be releasably connected to the chassis 12 through the use of fasteners, hinges, locks or other conventional attachment means. Additionally, the tabletop 54 can be removed from the chassis 12 and positioned directly onto a surface for supporting objects for applications where a conventional legged table is not desired.

While preferred embodiments of the present invention have been described and illustrated, numerous departures therefrom can be contemplated by persons skilled in the art, for example, the cover can take the form of a seat or a bench. Additionally, the cart assembly include two wheels with a support downwardly extending from the opposite end of the chassis for supporting the cart assembly. Therefore, the present invention is not limited to the foregoing description but only by the scope and spirit of the appended claims.

What is claimed is:

1. A toy ride-in wagon, comprising:
   a wagon body having a wagon bed providing a seating and storage area;
   four wheels operably coupled to the wagon body; and
   a frame including a generally planar and substantially rigid upper member and a plurality of leg support members, the support members coupled to the upper member and releasably coupled to the wagon body, the frame positionable in a first configuration, in which the upper member is substantially disposed over the wagon body thereby forming a cover over the wagon bed, and also positionable in a second configuration, in which the frame is decoupled from the wagon body and placed on a generally horizontal surface thereby forming a horizontally disposed table, whereby the wagon is adapted so that a child may ride with the frame on or off the wagon body and the frame may be used as a cover or a table.

2. The cart of claim 1 wherein the four wheels include a pair of rear wheels rotatably coupled to a rear portion of the body and a pair of front wheels pivotally and rotatably coupled to a front portion of the body, and further comprising a handle pivotally coupled to the front portion of the body.

3. The cart of claim 1 wherein the wagon bed includes a generally rectangular plate formed to four interconnected sidewalls upwardly extending from the plate, and a partition upwardly extending from the plate and interconnecting two of the sidewalls, the partition and the sidewalls defining first and second discrete storage compartments.

4. The cart of claim 3 further comprising a seat member removable coupled to the wagon bed over the first storage compartment.

5. The cart of claim 5 wherein the first storage compartment includes a cooler.

6. The cart of claim 1 wherein the plurality of leg support members include first and second support members releasably coupled to the upper member, each of the support members having an opening.

7. The cart of claim 1 wherein the plurality of leg support members are releasably coupled to the base without the use of tools.

8. The cart of claim 1 wherein the plurality of leg support members include first and second support members, the first and second members releasably coupled to the upper member without the use of tools.

9. The cart of claim 1 wherein the frame is positionable in a third configuration in which the plurality of leg support members are decoupled from the upper member and the body, and the upper member is disposed directly onto the body.

10. A cart comprising:
    a body including an upper surface, wherein the body is a wagon bed having a generally rectangular plate formed to four interconnected sidewalls upwardly extending from the plate, and a partition upwardly extending from the plate and interconnecting two of the sidewalls and with the partition and the sidewalls defining first and second discrete storage compartments;
    a plurality of wheels rotatably coupled to the body;
    a frame including a generally planar and substantially rigid upper member coupled to a plurality of leg support members, the frame configured for removable placement substantially over the upper surface of the body; and
    means for releasably coupling the plurality of leg support members to the body without the use of tools.

11. The cart of claim 10 wherein the means for releasably coupling the plurality of leg support members to the body without the use of tools is at least one projection downwardly extending from the a plurality of leg support members and a plurality of leg support member receiving slots defined within the body.

12. The cart of claim 11 wherein each of the projections is releasably snap fit within a separate support member receiving slot.

13. The cart of claim 10 wherein the body is selected from the group consisting of a wagon bed and a toy vehicle chassis.

14. The cart of claim 10 further comprising a seat member removably coupled to the wagon bed over the first storage compartment.

15. The cart of claim 10 wherein the frame is formed as a table.

16. The cart of claim 10 wherein the support member includes first and second support members, the first and second members releasably coupled to the upper member without the use of tools.

17. A cart comprising:
    a body having an upper surface and a lower surface, wherein the body comprises a wagon bed having a generally rectangular plate formed to four interconnected sidewalls upwardly extending from the plate, and a partition upwardly extending from the plate and interconnecting two of the sidewalls, the partition and the sidewalls defining first and second discrete storage compartments;
    at least two wheels operably coupled to the body; and
    a frame including a generally planar and substantially rigid upper member and at least one support member, the support member coupled to the upper member and releasably coupled to the body, the frame positionable in a first configuration, in which the upper member is substantially disposed over the upper surface of the body thereby forming a cover, and also positionable in a second configuration, in which the frame is decoupled from the body and placed on a generally horizontal surface thereby forming a horizontally disposed table.

18. A cart comprising:
    a body having an upper surface and a lower surface;
    at least two wheels operably coupled to the body; and
    a frame including a generally planar and substantially rigid upper member and at least one support member, the support member coupled to the upper member and releasably coupled to the body, the frame positionable in a first configuration, in which the upper member is substantially disposed over the upper surface of the body thereby forming a cover, also positionable in a second configuration, in which the frame is decoupled from the body and placed on a generally horizontal surface thereby forming a horizontally disposed table, and also positionable in a third configuration in which the at least one support member is decoupled from the upper member and the body, and the upper member is disposed directly onto the body.

* * * * *